United States Patent
Sirigiri et al.

(10) Patent No.: US 9,535,635 B2
(45) Date of Patent: Jan. 3, 2017

(54) CARRIER IMAGES

(71) Applicant: Hewlett-Packard Development Company, L.P., Fort Collins, CO (US)

(72) Inventors: Sekhar Muni Sirigiri, Bangalore (IN); Matthew D. Gaubatz, Seattle, WA (US); Robert Alan Ulichney, Stow, MA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 84 days.

(21) Appl. No.: 13/721,882

(22) Filed: Dec. 20, 2012

(65) Prior Publication Data

US 2014/0177006 A1 Jun. 26, 2014

(51) Int. Cl.
*G06F 3/12* (2006.01)

(52) U.S. Cl.
CPC ............ *G06F 3/1208* (2013.01); *G06F 3/123* (2013.01); *G06F 3/1205* (2013.01); *G06F 3/1242* (2013.01); *G06F 3/1271* (2013.01); *G06F 3/1287* (2013.01); *G06F 3/1288* (2013.01); *G06F 3/1265* (2013.01); *G06F 2221/0733* (2013.01); *H04N 2201/327* (2013.01); *H04N 2201/3233* (2013.01)

(58) Field of Classification Search
USPC ....................................................... 358/3.28
See application file for complete search history.

(56) References Cited

U.S. PATENT DOCUMENTS

| | | | |
|---|---|---|---|
| 5,734,752 A * | 3/1998 | Knox | 358/3.28 |
| 5,899,700 A | 5/1999 | Williams et al. | |
| 7,289,685 B1 * | 10/2007 | Wolff et al. | 382/317 |
| 7,528,993 B2 * | 5/2009 | Rosen | 358/3.28 |
| 7,561,295 B2 | 7/2009 | Otsuji et al. | |
| 7,634,105 B2 | 12/2009 | Moroo et al. | |
| 7,783,323 B2 | 8/2010 | Silverbrook et al. | |
| 7,885,955 B2 | 2/2011 | Hull et al. | |
| 7,933,234 B2 | 4/2011 | Iso et al. | |
| 7,999,965 B2 | 8/2011 | Otsuji et al. | |
| 8,045,748 B2 * | 10/2011 | Levy | 382/100 |
| 2005/0140679 A1 * | 6/2005 | Kaneda | 345/441 |
| 2005/0171914 A1 * | 8/2005 | Saitoh | 705/51 |

(Continued)

FOREIGN PATENT DOCUMENTS

| | | | | |
|---|---|---|---|---|
| IN | WO 2011090474 A1 * | 7/2011 | | G06F 3/1204 |
| JP | 11053132 A * | 2/1999 | | |

OTHER PUBLICATIONS

Ulichney et al., "Encoding Information in Clustered-Dot Halftones", 26th international Conference on Digital Printing Technologies, Oct. 6, 2010.*

(Continued)

*Primary Examiner* — Richard Zhu
(74) *Attorney, Agent, or Firm* — HP Inc. Patent Department (57) ABSTRACT

In one example, a first directive is received at a system. The directive is to embed, into content selected via a printer application accessed at a network-connected printer, a network address. A carrier image that includes the network address in encoded form is generated. A second directive, to provide first content to the printer, is received via the application. The carrier image is merged into the first content. After the merging, the merged first content is sent to the printer for printing.

16 Claims, 7 Drawing Sheets

(56) References Cited

U.S. PATENT DOCUMENTS

| | | | |
|---|---|---|---|
| 2005/0283448 A1* | 12/2005 | Dixon | G06F 17/30879 |
| | | | 705/408 |
| 2006/0244751 A1* | 11/2006 | Kitora | 345/501 |
| 2007/0097445 A1* | 5/2007 | Tachi | H04N 1/32133 |
| | | | 358/3.28 |
| 2007/0127085 A1* | 6/2007 | Mori | 358/403 |
| 2008/0100624 A1* | 5/2008 | Matsunaga | 345/469.1 |
| 2009/0103140 A1* | 4/2009 | Yamamoto | 358/3.09 |
| 2009/0180133 A1* | 7/2009 | Yamamoto | 358/1.13 |
| 2009/0284780 A1* | 11/2009 | Kitora et al. | 358/1.13 |
| 2010/0123908 A1 | 5/2010 | Denoue et al. | |
| 2011/0069328 A1 | 3/2011 | Ulichney et al. | |
| 2012/0042025 A1 | 2/2012 | Jamison et al. | |
| 2012/0208592 A1 | 8/2012 | Davis et al. | |

OTHER PUBLICATIONS

JPO machine translation of JP11-053132.*
WO2011/090474 A1.*
"About Digital Watermarking", http://www.digimarc.com/technology/about-digital-watermarking; Digimarc Corporation; 2012; 2 pages.
J & R Technologies; "CoverText Review"; Apr. 9, 2012; 5 pages.
Thomson, J.; "Camopic Allows You to Send Hidden Images to Other Users, Reminisce Over the Cold War"; Mar. 29, 2012; 8 pages.
U.S. Appl. No. 12/563,432, filed Sep. 21, 2009; entitled: "System and Method for Creating A Data-bearing Image".
Aurasma, "Aurasma," Partners, (web page), Nov. 26, 2012, <http://web.archive.org/web/20121126063759/http://www.aurasma.com/partners>.

\* cited by examiner

CARRIER IMAGES

BACKGROUND

Certain network-connected printers are capable of sending and receiving communications and printable content via the internet without being connected to a desktop computer, notebook computer, or other host computing device. Such printers may also provide users with an option to download and execute, or to otherwise access at the printer, printer applications that facilitate content browsing, downloading, and printing of content that is available to the printer via the internet.

BRIEF DESCRIPTION OF THE DRAWINGS

The accompanying drawings illustrate various examples and are a part of the specification. The illustrated examples do not limit the scope of the claims. Throughout the drawings, identical reference numbers designate similar, but not necessarily identical elements.

The same part numbers designate the same or similar parts throughout the figures.

DETAILED DESCRIPTION OF EXAMPLES

An advantage of an internet-connected printer is that content can be obtained and printed at the printer via a public cloud print service or an enterprise cloud print service, without the printer being connected to a host computing device. Another advantage is that a print job can be rasterized by a rasterizing computing system that is a part of a public cloud print service or an enterprise cloud print service, thereby making available to the printer rasterizing capabilities that might not be available at the printer alone (e.g., due to a limited number of rasterizing options, or limited memory processing capability). A limitation to these advantages has been difficulty to provide a highly interactive experience at the printer that encourages usage of the printer's internet connectivity capabilities. Research has shown that a significant number of users of internet connected printers do not take advantage of the ability to download printer applications that would enable the user to access content via the internet from the printer, and move rending functionality to the cloud.

Accordingly, various examples described herein were developed to provide a cloud-based printer application service that enables users to download compelling printer applications. Examples of the disclosure will enable a user to direct embedding of a URL or other network address into content selected for printing via a printer application, and to direct the downloading of the printer application to the printer. The downloaded printer application will enable a user to utilize a cloud-based print service to generate printed output that has a stegatone or other carrier image merged with the content to be printed.

After the content and carrier image are printed to a media, a user can utilize a smart phone or other computing device that has image-capture capability to scan the hard copy printout and send the carrier image to the printer application service via the internet. In an example, the printer application service in turn will decode the carrier image to reveal a URL or other network address, and return that network address to the smart phone. The smart phone can then utilize the network address to access via the internet video content, audio content, a web page, or other engaging content that relates to the content of the printed page.

Advantages of the disclosure are numerous. First, the cloud-based printer application service will enable users to download compelling printer applications. Users will appreciate the resulting highly interactive experience at the printer, and will be more likely to explore and utilize the printer's other web-enabled capabilities. User satisfaction with network-connected printers and cloud print services will increase. Further, merging of the data-bearing carrier image with content to be printed will work with any type of printable content, e.g., text, business graphics, and images. Another significant advantage of the disclosure is that, in examples, the data-bearing carrier image need not be rasterized as part of the printing process. For instance, if the carrier image is a data-bearing half-tone image, the carrier image is already in raster format and need not be rasterized prior to printing. In another example, it will be possible to merge PDF based content with a stegatone as a bi-tonal raster image. In this latter example, at the printing step only the PDF portion (the content) is rasterized. Limiting rasterizing to the content, and avoiding a step of rasterizing the carrier image, will save processing and printing time and be attractive to users. Further, possibility of user error with the disclosed system is minimized as, in an example, creation of the carrier image that encodes the user-provided network address and merging of the carrier image with user-selected content is opaque to the user.

It should be noted that while the disclosure is discussed frequently with reference to internet-connected printers, the teachings of the present disclosure are not so limited and can be applied to any network-connected printer. As used herein, a "network-connected printer" refers to a printer that is connected to a network, to be capable of obtaining content, sending and receiving messages, accessing network content, and/or accessing applications via a network. In examples, the network may be a proprietary network, a secured network, an open network, an intranet, an extranet, an internet or the Internet. As used in this application, a "printer" or "printing device" refers to any liquid inkjet printer, solid toner-based printer, liquid toner-based printer, or any other electronic device that prints. "Printer" or "printing device" includes any multifunctional electronic device that performs a function such as scanning and/or copying in addition to printing. "Printer application" refers to a software application that is accessible to a user at a network-connected printer and that enables retrieval of content from computing devices external to the printer. "Content" refers to text, images, and/or other subject matter or other information that can be received by a computer system for printing, and/or stored at a computer system, e.g., for later printing. A "cloud printer service" refers to a service that enables users to send content and otherwise communicate with network connected printers via a network (e.g., the Internet). A "print job" or "job" refers to content and/or instructions as to formatting and presentation of the content sent to a computer system for printing. A print job may be stored in a programming language and/or numerical form so that it can stored and used in computing devices, servers, printers and other machines capable of performing calculations and manipulating data.

"Halftoning" refers to any process that creates the illusion of continuous-tone images by judicious arrangement of binary picture elements, such as ink drops in the case of inkjet printers. "Stegatone" and "stegatonic halftone" and "data-bearing halftone" are used synonymously in this application and refer to halftone image that has been generated in such a way that an encoded data payload is incorporated into the image. "Encoded" refers to presentation in a format that is generally not readable by a human without the aid of a machine. "Rasterizing" refers to a raster processing or other processing of an image to a bitmap format.

A "directive" refers to an instruction, order, command, or direction. To "scan" refers to capturing an image of an object, e.g. with a camera, flatbed scanner, or any other electronic device, and generating a digital representation of the image that can stored at or manipulated by a computer. A "network address" refers to a character string, text, image, graphic, or other element that, when accessed via an internet or other network, provides an electronic link to or causes the loading of a web page, text or graphic, video, audio, or other displayable content. To "display" refers to exhibiting or presenting for perception by a user, and includes, but is not limited to visual, auditory and tactile presentations. The terms "mobile computing device" and "mobile device" are used synonymously, and refer to any portable computing device capable of communicating with another computing device.

Figure 1:
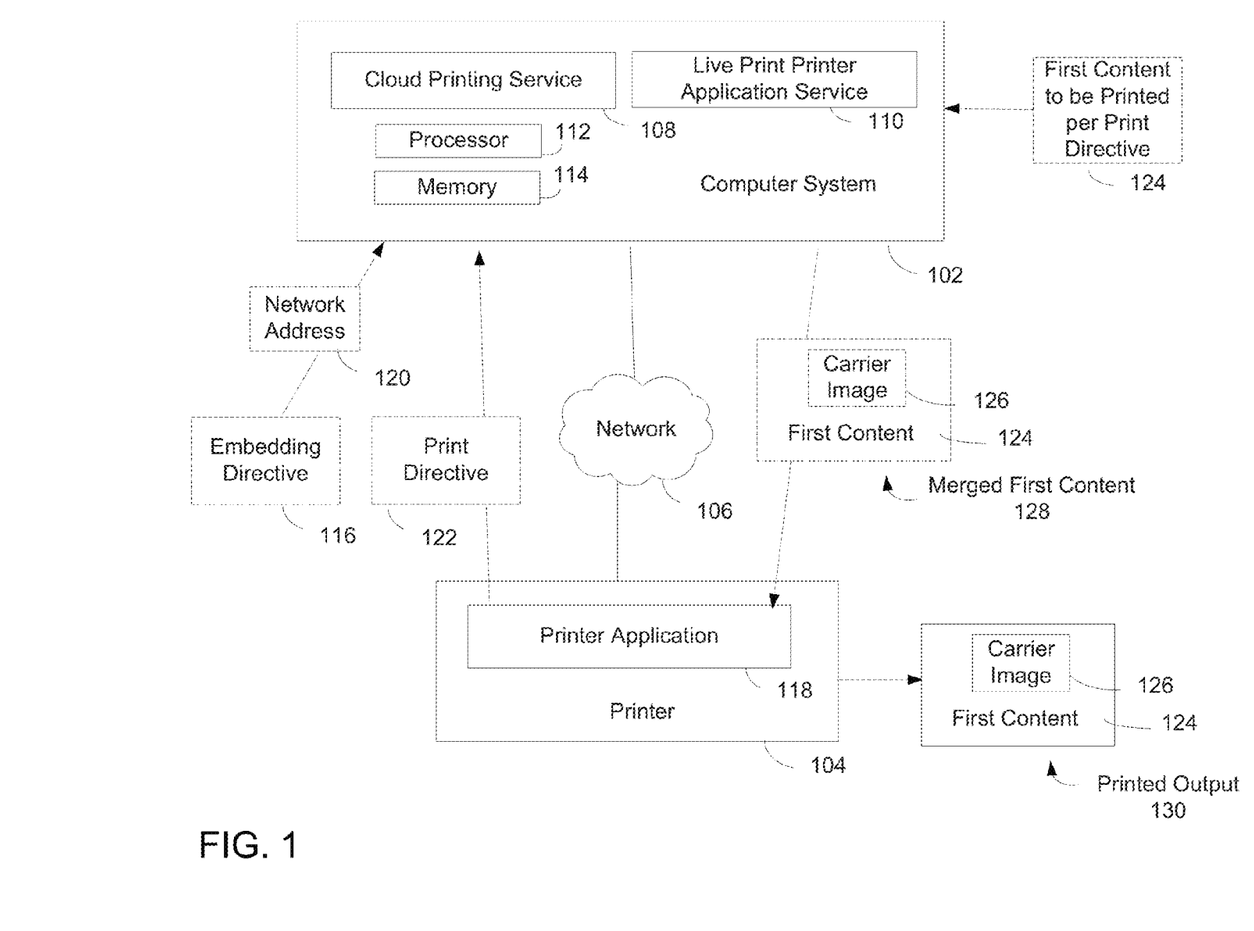
FIG. 1 is a block diagram illustrating a system according to various examples.

FIG. 1 shows a computer system 102 and a printer 104, electronically connected to each other via a network 106.

Computer system 102 represents generally any computing device or group of computing devices configured to send and receive network requests, send and receive data, and/or otherwise communicate with the network-connected printer 104. In an example, the computer system 102 may be a server, desktop computer, notebook computer, tablet computer, smartphone, or any other computing device.

Network connected printer 104 represents generally any computing device or group of computing devices operable to produce a printed print job or printed content, and additionally operable to send and receive internet requests, receive printable content and print jobs, and otherwise communicate, via the network 106, with, the computer system 102.

Network 106 represents generally hardware components and computers interconnected by communications channels that allow sharing of resources and information. Network 106 may include a cable, wireless, fiber optic, or remote connection via a telecommunication link, an infrared link, a radio frequency link, or some combination of these, or any other connectors or systems that provide electronic communication. Network 106 may include, at least in part, an intranet, the internet, or a combination of both. Network 106 may also include intermediate proxies, routers, switches, load balancers, and the like. The paths followed by network 106 between the computer system 102 and the printer 104 as depicted in FIG. 1 represent the logical communication paths between these devices, not necessarily the physical paths between the devices.

Computer system 102 is shown to include a cloud print service 108, a live print printer application service 110, a processor 112, and a memory 114. Cloud print service 108 represents generally any combination of hardware and programming configured to facilitate the sending and receiving of print content and network communications between computer system 102 and printer 104 across the network 104, without the necessity of any host computing device being connected to printer 104. The live print printer application service (also referred to herein as "LPPAS") 110 represents generally any combination of hardware and programming configured to facilitate the embedding of a carrier image into hard copy output printed via a printer application. The embedded carrier image includes a URL or other internet address that, when scanned by a scanning computing device, serves as a link to video, audio, web page or other content to be displayed at the scanning computing device.

In the example of FIG. 1, the LPPAS 110 executing at the computer system 102 receives, via the network 106, an embedding directive 116 sent at the initiation of a user. The embedding directive 116 instructs the LPPAS 110 to, when a print directive is received at computer system 102, embed a URL or other network address 120 into content that is to be printed as a result of such directive. In an example, the network address 120 to be embedded into content is an address for a web page, video content, audio content, or other content is to be displayed by a means other than printing.

In the example of FIG. 1, the embedding directive 116 is a general instruction to the LPPAS 110 to be applied when a print directive is received at computer system 102 from printer 104 via the printer application 118. In an example, the embedding directive 116 is received at the computer system 102 via the network 106, with the directive 116 having been initiated at a user interface, e.g., a graphic user interface display, at the printer 104. In another example, the embedding directive 116 is received via the network 106 at the computer system 102, having been initiated at a user interface, e.g., a graphic user interface display, at a computing device other than printer 104 (e.g. a desktop computer, notebook computer, or mobile computing device).

In the example of FIG. 1 the printer application 118 executes at the printer 104, and is accessed or interacted with by a user at printer 104, to enable printing of user-requested content including a carrier image holding an encoded address for video, audio, or an associated web page content. In another example, the printer application 118 is a printer application that executes at a computing device other than printer 104, but is accessed by or interacted with by a user at printer 104 via the network 106 connection. In yet another example, the printer application 118 executes at a computing device 102, and is accessed by or interacted with by a user at printer 104 via the network 106 connection.

Continuing with the example of FIG. 1, the received embedding directive 116 was sent to the LPPAS 110 at the direction of a user as a general instruction, and not in connection with any particular print directive or print job. In one example, the embedding directive 116 may be received at the LPPAS 110 from printer 104, as a part of a web-enabled printer setup procedure that enables the printer 104 to utilize the cloud printing service 108 hosted at computer system 102. In another example, the embedding directive 116 may be received, as a part of a web-enabled printer setup procedure that enables the printer 104 to utilize the cloud printing service 108, from a computing device other than printer 104.

Continuing with the example of FIG. 1, the LPPAS 110 generates or otherwise creates a carrier image 126 that includes the network address 120 in an encoded form. In some implementations, the encoded carrier image 126 is generated using halftoning to produce a steganographic image (also referred to as a "steganographic halftone" or a "data-bearing halftone image") by a process such as that described in U.S. Patent Application Publication No. 2011/0069328 entitled "System and Method for Creating a Data-Bearing Image," which is hereby incorporated by reference in its entirety. In other examples, the carrier image 126 may be an image that is encoded through another process that generates a data-bearing halftone image. In other examples, the carrier image 126 may be an image that is encoded other than through halftoning. For instance, the carrier image 126 may in examples may be or include a 2D barcode, a QR code, or other image that is encoded to include a data payload.

Continuing with the example of FIG. 1, at a time occurring after the LPPAS's 110 receipt of the embedding directive 116, and after setup of the printer 104 to have access to the cloud printing service 108 hosted at the computer system 102, the LPPAS 110 receives from the printer 104 a print directive 122. In this example, the print directive 122 is an instruction for the LPPAS 110 to obtain first content 124 and process, to the extent needed, such first content 124 for printing by printer 104. In an example, the first content 124 is obtained from a content repository included within computer system 102. In another example, the first content 124 is obtained from a content repository that is a part of a second system other than computer system 102, such second system being accessible to computing device 102 via network 106. In yet another example, the print directive 122 received by the LPPAS 110 may include the first content 124 to be processed for printing at printer 104.

Continuing with the example of FIG. 1, the LPPAS 110 merges the carrier image 126 into the first content 124 to create a merged first content 128. In one example, the LPPAS 110 rasterizes the first content prior to the merger of the carrier image 126 into the first content to form the merged first content 128. In another example, the LPPAS 110 merges the carrier image 126 into the first content 124 to form the merged first content 128, and then rasterizes the first content 124 portion of the merged first content 128 without rasterizing the carrier image 126. In examples where the carrier image 126 is a stegatone, steganographic halftone, or data-bearing halftone image, rasterizing of the carrier image 126 is not required as such carrier image 126 is already in print-ready, pixel-specific format. In yet another example in which the first content is PDF-based content and the carrier image 126 is a data-bearing halftone image, the PPAS 110 merges the data-bearing halftone carrier image 126 into the PDF-based first content 124 to form the merged first content 128, and then rasterizes the PDF content without rasterizing the carrier image 126.

After the merging of the carrier image 126 and the first content 124 to form the merged first content 128, the LPPAS 110 sends the merged first content 128, via the network 106, to the printer 104 for printing. The printer 104 then generates a printed output 130 that includes the merged first content 128.

In examples, the LPPAS 110 may receive the embedding directive 116, the print directive 122, and/or the first content 124, and the LPPAS 110 may send the merged first content 128 to the printer 104, over the network 106 via a networking protocol, including but not limited to Transmission Control Protocol/Internet Protocol ("TCP/IP"), HyperText Transfer Protocol ("HTTP"), and/or Session Initiation Protocol ("SIP").

The functions and operations described with respect to the LPPAS 110 and the computer system 102 may be implemented as a non-transitory computer-readable storage medium containing instructions executed by a processor (e.g., processor 112) and stored in a memory (e.g., memory 114). In a given implementation, processor 112 may represent multiple processors, and memory 114 may represent multiple memories. Processor 112 represents generally any instruction execution system, such as a computer/processor based system or an ASIC (Application Specific Integrated Circuit), a computer, or other system that can fetch or obtain instructions or logic stored in memory 114 and execute the instructions or logic contained therein. Memory 114 represents generally any memory configured to store program instructions and other data.

Figure 2:
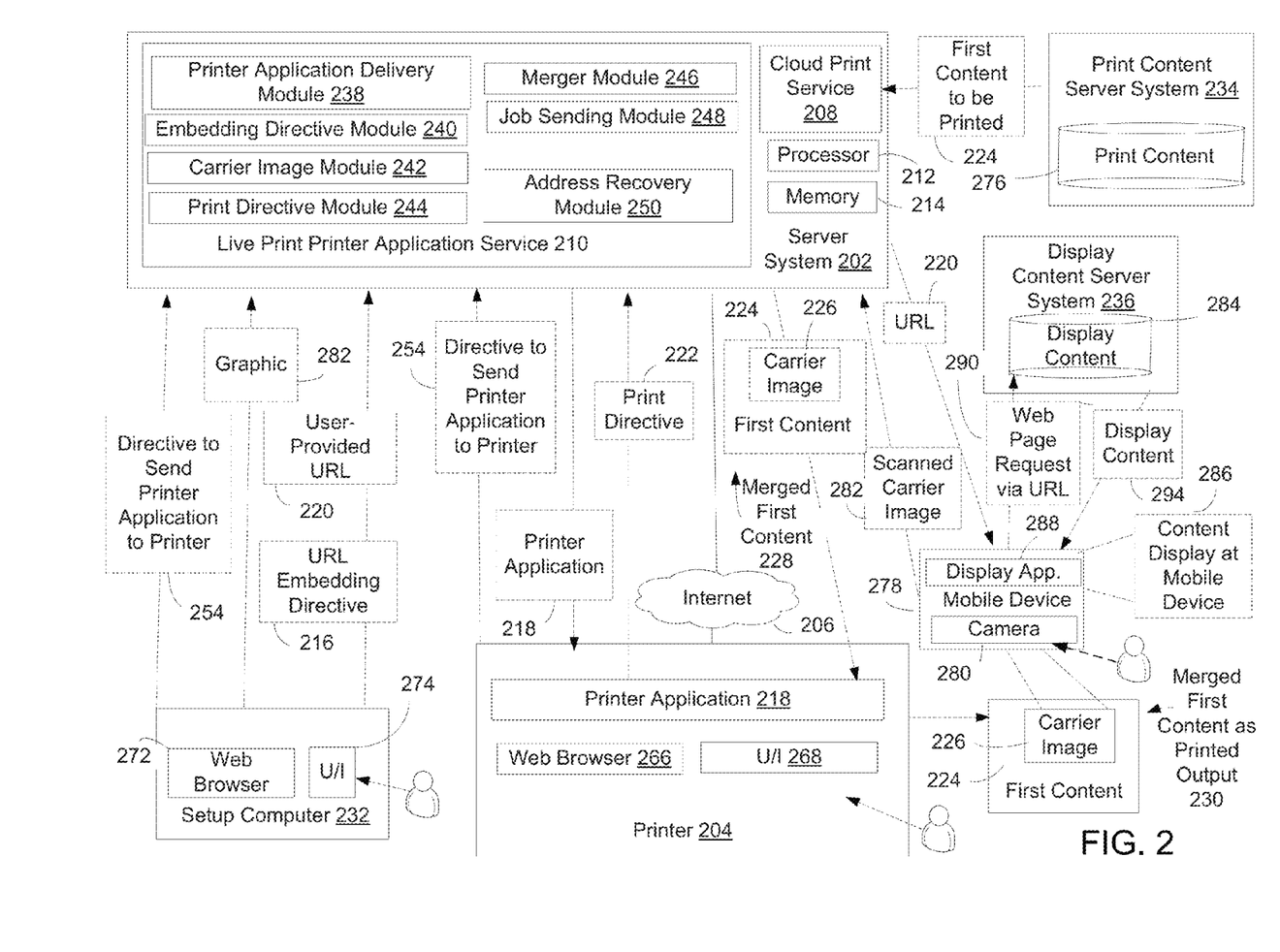
FIG. 2 is a block diagram illustrating a system according to various examples.

FIG. 2 is a block diagram illustrating a system according to various examples. FIG. 2 includes particular components, modules, etc. according to various examples. However, in different examples, more, fewer, and/or other components, modules, arrangements of components/modules, etc. may be used according to the teachings described herein. In addition, various components, modules, etc. described herein may be implemented as one or more software modules, hardware modules, special purpose hardware (e.g., application specific hardware, application specific integrated circuits (ASICs), embedded controllers, hardwired circuitry, etc.), or some combination of these.

FIG. 2 shows a server system 202, a printer-setup computing device 232, a print content server system 234, a display content server system 236, and a printer 204, each electronically connected to each other via an Internet 206.

Server system 202 represents generally any computing device or group of computing devices configured to send and receive network requests, send and receive data, and/or otherwise communicate with the internet-connected printer 204. In an example, the server system 202 may be a server, desktop computer, notebook computer, tablet computer, smartphone, or any other computing device.

Printer-setup computing device 232 represents generally any computing device or group of computing devices configured to send and receive network requests, send and receive data, and/or otherwise communicate with the server system 202. The sending and receiving of network requests and data, and communications includes, but is not limited to, network requests, data, and communications associated with setting up of printer 204 to communicate and work with cloud print service 208 executing at the server system 202. In this example, the printer-setup computing device 232 is shown to include a web browser 272 and user interface 274. In an example, the printer-setup computing device 232 may be a server, desktop computer, notebook computer, tablet computer, smartphone, or any other computing device.

Print content server system 234 represents generally any computing device or group of computing devices configured to send and receive network requests, send and receive data, and/or otherwise communicate with the server system 202. The sending and receiving of network requests and data, and communications includes, but is not limited to, network requests, data, and communications associated with providing print content to server system 202 to satisfy a print request initiated by a user of the cloud print service 208 hosted at server system 202. In this example, the print content server system 234 is shown to include a print content repository 276 representing a database and/or memory for the storing of printable content. In an example, the print content server system 234 may be a server, desktop computer, notebook computer, tablet computer, smartphone, or any other computing device.

Display content server system 236 represents generally any computing device or group of computing devices configured to send and receive network requests, send and receive data, and/or otherwise communicate with the server system 202. The sending and receiving of network requests and data, and communications includes, but is not limited to, network requests, data, and communications associated with providing display content to server system 202 in response to a recovery of a URL or other internet address from printed output via the live print printer application service 210 hosted at server system 202. In this example, the display content server system 236 is shown to include a display content repository 284 representing a database and/or memory for the storing of video, audio, web page or other displayable content. In an example, the display content server system 236 may be a server, desktop computer, notebook computer, tablet computer, smartphone, or any other computing device.

Internet-connected printer 204 represents generally any computing device or group of computing devices operable to produce a printed print job or printed content, and additionally operable to send and receive internet requests, receive printable content and print jobs, and otherwise communicate, via the internet 206, with, the server system 202. In this example, the printer is shown to include a printer application 218 downloaded from server system 202 via the LPPAS 210, a web browser 266, and a touch-sensitive display screen or other user interface 268 to enable a user to communicate print requests, print application download requests, and other requests and information to the printer 204.

Internet 206 represents generally hardware components and computers interconnected by communications channels that allow sharing of resources and information. Internet 206 may include a cable, wireless, fiber optic, or remote connection via a telecommunication link, an infrared link, a radio frequency link, or some combination of these, or any other connectors or systems that provide electronic communication. Internet 206 may be or include, at least in part, an intranet, the Internet, or a combination of both. Internet 206 may also include intermediate proxies, routers, switches, load balancers, and the like. The paths followed by internet 206 between the server system 202, the printer 204, the setup computer 232, the print content server system 234, and the display content server system 236 as depicted in FIG. 2 represent the logical communication paths between these devices, not necessarily the physical paths between the devices.

Server system 202 is shown to include a cloud print service 208, a live print printer application service 210, a processor 212, and a memory 214. Cloud print service 208 represents generally any combination of hardware and programming configured to facilitate the sending and receiving of print content and network communications between server system 202 and printer 204 across the internet 206, without the necessity of any host computing device being connected to printer 204. The live print printer application service (also referred to herein as "LPPAS") 210 includes a printer application delivery module 238, an embedding directive module 240, a carrier image module 242, a print directive module 244, a merger module 246, a job sending module 248, and an address recovery module 250. Processor 212 represents generally any instruction execution system, such as a computer/processor based system or an ASIC (Application Specific Integrated Circuit), a computer, or other system that can fetch or obtain instructions or logic stored in memory 214 and execute the instructions or logic contained therein. Memory 214 represents generally any memory configured to store program instructions and other data.

In the example of FIG. 2, the printer application delivery module 238 executing at the server system 202 receives, via internet 206, a directive 254 to send printer application 218 to printer 204. For purposes of this FIG. 2, printer application 218 is a "live print" printer application that will enable a user to cause the embedding of a carrier image into hard copy output printed via the application. The carrier image includes a URL or other internet address that, when scanned by a scanning computing device, can serve as a link to video, audio, web page or other additional content that can be displayed at the scanning computing device.

In an example, the directive 254 for the LPPAS 210 to send the printer application 218 to the printer 204 is received from a setup computer 232 that is communicating with server system 202 during an operation to set up printer 204 to utilize the accessing the cloud print service 208 hosted at server system 202. FIG. 2 also illustrates that, in another example, the directive 254 can be received from the printer 204. For example, the directive 204 may be received from printer 204 during an operation in which a user, via interaction with a printer user interface 268 interacts with cloud printer service 208 to browse and download printer applications to printer 204.

Figure 3:
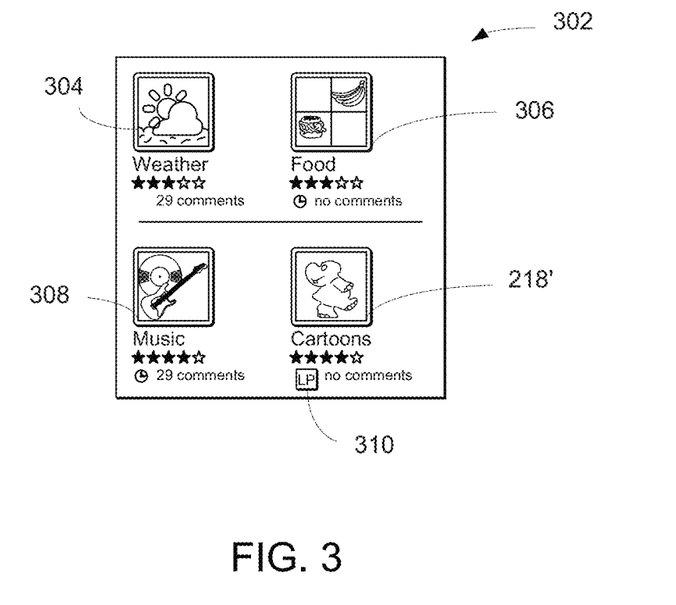
FIG. 3 is a screenshot of a graphic user interface to enable a user to direct sending of a printer application to a printer, according to various examples.

FIG. 3 provides an example a screenshot of a graphic user interface 302 to enable a user to direct the sending of the printer application 218 to printer 204. As is discussed in the preceding paragraph, this graphic user interface 302 could be presented to a user at a printer setup computer 232 during a printer setup operation, or could be presented to a user at the printer 204 after the printer setup to communicate with cloud print service 208. In this example, user interface 302 presents a display with GUI icons that, when selected by the user, cause the sending of any or all the following printer applications to printer 204: a weather-related print application 304, a food-related printer application 306, a music-related printer application 218', and a coloring page printer application 218' to enable printing of cartoon coloring pages at printer 204. These printer applications, when executed or accessed at printer 204, will enable a user to retrieve printable content to the printer 204, via the internet 206, for printing at printer 204. In the example of FIG. 3, the graphic user interface 302 include an "LP" icon 310 adjacent to the coloring page printer application 218' icon to indicate the coloring page printer application 218' is a "live print" printer application.

Returning to the example of FIG. 2, the printer application delivery module 238, responsive to receipt of a directive 254 to send a printer application to printer 204, sends a printer application 218 to the printer 204. For purposes of this FIG. 2 example, we can assume that the printer application 218 that is sent to printer 204 is the same as the coloring page printer application 218' of FIG. 3.

Continuing with FIG. 2, the embedding directive module 240 executing at the server system 202 receives an embedding directive 216 sent at the initiation of a user. The embedding directive 216 instructs the LPPAS 210 to, when a print directive is received at server system 202, embed a URL 220 or other internet address into content that is to be printed as a result of such print directive 222. In the example of FIG. 2, the embedding directive 216 may be sent to the server system 202 from the setup computer 232, following a user's 252 selection, at the setup computer 232, of a printer application to be sent by server system 202 to printer 204. FIG. 2 also illustrates that the embedding directive 216 may be alternatively be sent to the server system 202 from the printer 204 following a user's 252 selection of the printer application at the printer's user interface 268.

Figure 4:
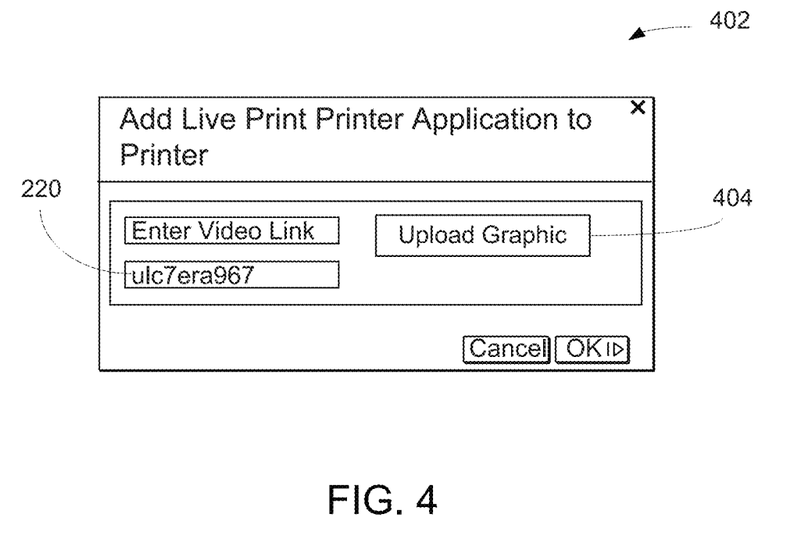
FIG. 4 is a screenshot of a graphic user interface to enable a user to direct embedding of a network address into content selected for printing via a printer application, according to various examples.
Figure 5:
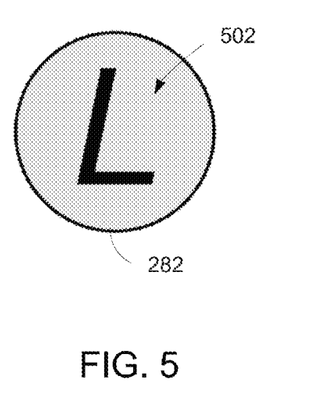
FIG. 5 depicts a grayscale image of a graphic logo.

FIG. 4, in view of FIG. 2, illustrates a graphic user interface 402 that may be provided to a user (e.g. via display at the setup computer 232 user interface 274, or the printer's 204 user interface 268) to prompt the user to provide a URL 220 or other internet address to be embedded into content printed via the printer application 218. In an example, the URL 220 to be embedded into print content is an address for a web page, video content, audio content, or other content is to be displayed by a means other than printing. In an example, the graphic user interface 402 may also provide the user with a graphic upload icon 404, that when selected by the user gives the user an opportunity to provide a particular logo or other graphic 282 to the server system 202. The uploaded graphic 282 is to serve as a carrier image for the internet address, such that when the carrier image is scanned by a computing device video, audio, a web page, or other display content that is available via the URL 220 is displayed at the scanning computing device. FIG. 5, in view of FIG. 2, illustrates an example grayscale image an "L" corporate logo graphic 282 that is uploaded to server system 202 for the LPPAS 210 to convert to a carrier image.

Continuing with the example of FIG. 2, the carrier image module 242 generates a carrier image 226 that includes the URL 220 or other internet address in an encoded form. In the example of FIG. 2, an encoded carrier image 226 is generated using halftoning to produce a steganographic image (also referred to as a "steganographic halftone" or a "data-bearing halftone image"). In other examples, the carrier image 226 may be an image that is encoded through another process that generates a data-bearing halftone image. In other examples, the carrier image 226 may be an image that is encoded other than through halftoning. For instance, the carrier image 226 may in examples may be or include a 2D barcode, a OR code, or other image that is encoded to include a data payload.

Figure 6:
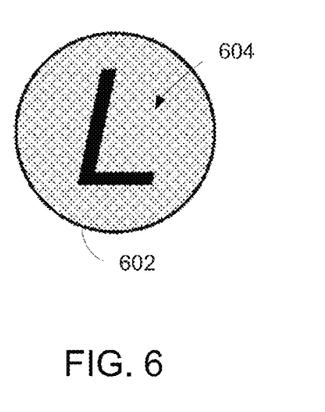
FIG. 6 depicts a bi-tonal clustered-dot halftone of the graphic logo of FIG. 5.
Figure 7:
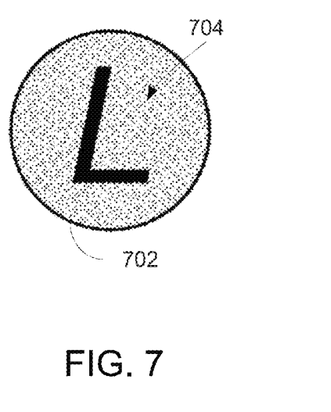
FIG. 7 depicts a bi-tonal clustered-dot halftone of the graphic logo of FIG. 5, having selected clusters shifted to carry bits representative of a network address.

FIGS. 5-7, in view of FIG. 2, provide an example of generation of an encoded carrier image 226 utilizing halftoning to produce a data-bearing halftone image. FIG. 5 depicts a grayscale image "L" corporate logo graphic 282 that is uploaded to server system 202. The example logo graphic 282 includes a uniform gray background 502. FIG. 6 depicts a halftone version 602 of the graphic logo 282 after application of a conventional halftoning process to the logo 282. In this example, it can be seen the application of the conventional halftoning process to recreate the uniform gray background 502 of the grayscale image 282 results in a uniform distribution 604 of pixels or dots to emulate the grayscale background 502. FIG. 7 depicts a data-bearing, bi-tonal clustered-dot halftone 702 of the graphic logo 282. As a result of the bi-tonal clustered-dot halftone process, the resulting halftone 702 has selected clusters 704 of pixels or dots shifted from the uniform distribution 604 that would result from application of a traditional halftone process (see FIG. 6). The clusters 704 of pixels or dots carry a dataload or dataloads of bits representative of the URL 220.

Returning to FIG. 2, at a time occurring after the server system 202's receipt of the embedding directive 216, print directive module 244 receives from the printer 204 a print directive 222. In this example, the print directive 222 is an instruction for the cloud printing service 208 to obtain first content 224 by accessing a print content repository 276 hosted by the print content server system 234. In other examples, the print directive module 244 may obtain the content to be printed by accessing a print content database or repository that is a part of server system 202. In yet another example, the print directive 222 received by the print directive module 244 may include the first content 224 to be processed for printing at printer 204. For instance, the print directive may be an email with the content to be printed attached as a .jpg, .pdf or .gif file.

In the example of FIG. 2, the print directive 222 that is received at print directive module 244 is a directive that was sent from printer 204 as a result of a user interaction with a user interface 268 at the printer 204. In another example, the print directive 222 that is received at print directive module 244 can be a print directive that was sent from printer 204 as a result of the running of an automated process that does not require a user interaction at the printer for each print request (e.g. a scheduled delivery print process). In yet another example, the print directive 222 that is received at print directive module 244 may be a directive that was sent from a computing device other than printer 204. For instance, the print directive 222 may be a communication (e.g. an email or SMS) that references the printer 204 and instructs print directive module 244 to retrieve content for printing at printer 204.

Continuing with the example of FIG. 2, the merger module 246 merges the carrier image 226 into the first content 224 to create a merged first content 228. In one example, the merger module 246 causes the server system 202 to rasterize the first content 224 prior to the merger of the carrier image 226 into the first content 224 to form the merged first content 228. In another example, the merger module 246 causes the merging of the carrier image 226 into the first content 224 to form the merged first content 228, and then the merger module 246 rasterizes the first content 224 portion of the merged first content 228 without rasterizing the carrier image 226. In certain examples where the carrier image 226 is a stegatone, steganographic halftone, or data-bearing halftone image, rasterizing of the carrier image 226 is not needed as such carrier image 226 is already in printer-ready, pixel-specific format. In certain examples where the carrier image is not already in a printer-ready, pixel-specific format, the merger module 246 may rasterize all of the merged first content 228.

Following the merging of the carrier image 226 and the first content 224 to form the merged first content 228, the job sending module 248 sends the merged first content 228, via the internet 206, to the printer 204 for printing. In an example, the printer 204 then performs a printing operation to cause the merged first content 228 (including the first content portion 224 and the carrier image portion 226) to be printed upon a media as printed output 230.

Continuing with the example of FIG. 2, at some point after generation of the printed output 230 at printer 204, a scanner device (e.g. a camera, flatbed scanner, or any other electronic device configured to generate a digital representation an image) creates a scanned image of the merged first content 228. In an example, a user causes a mobile computing device 278 that includes a camera 280 to take a digital photographic or otherwise create a digital representation of the merged first content included within the printed output 230. In examples, the mobile computing device may be a smart phone, tablet computer, or notebook computer.

Continuing with the example of FIG. 2, after generating a digital representation of the merged first content as printed at printed output 230, the mobile computing device 278 sends the scanned carrier image 282 to the server system 202 via the internet 206. The address recovery module 250 receives the scanned carrier image 282, and extracts, interprets, decodes, or otherwise recovers the URL 220 address from the carrier image 226 included within the printed output 230. The address recovery module 250 then sends the URL to the mobile computing device 278 for the device to utilize to access display content 294 for display at the mobile device 278. In an example, the display content 294 may be video content, audio content, web page content, or any other content that is accessible to mobile device 278 via the URL and that can be displayed at the mobile device. In the example of FIG. 2, after receipt of the URL 220 from the server system 202, the mobile device 278 sends a web page request 290 to the display content server system 236, via the URL 220. The display content server system 236 accesses a display content repository 284 that stores the requested display content 294, and then sends the display content 294 to the mobile device 278 for display 286 via the device's display apparatus 288. In examples, the display apparatus 288 may include, but is not limited to, a visual display apparatus such as a display screen or touchscreen, or an audio display device such as a speaker.

Figure 8:
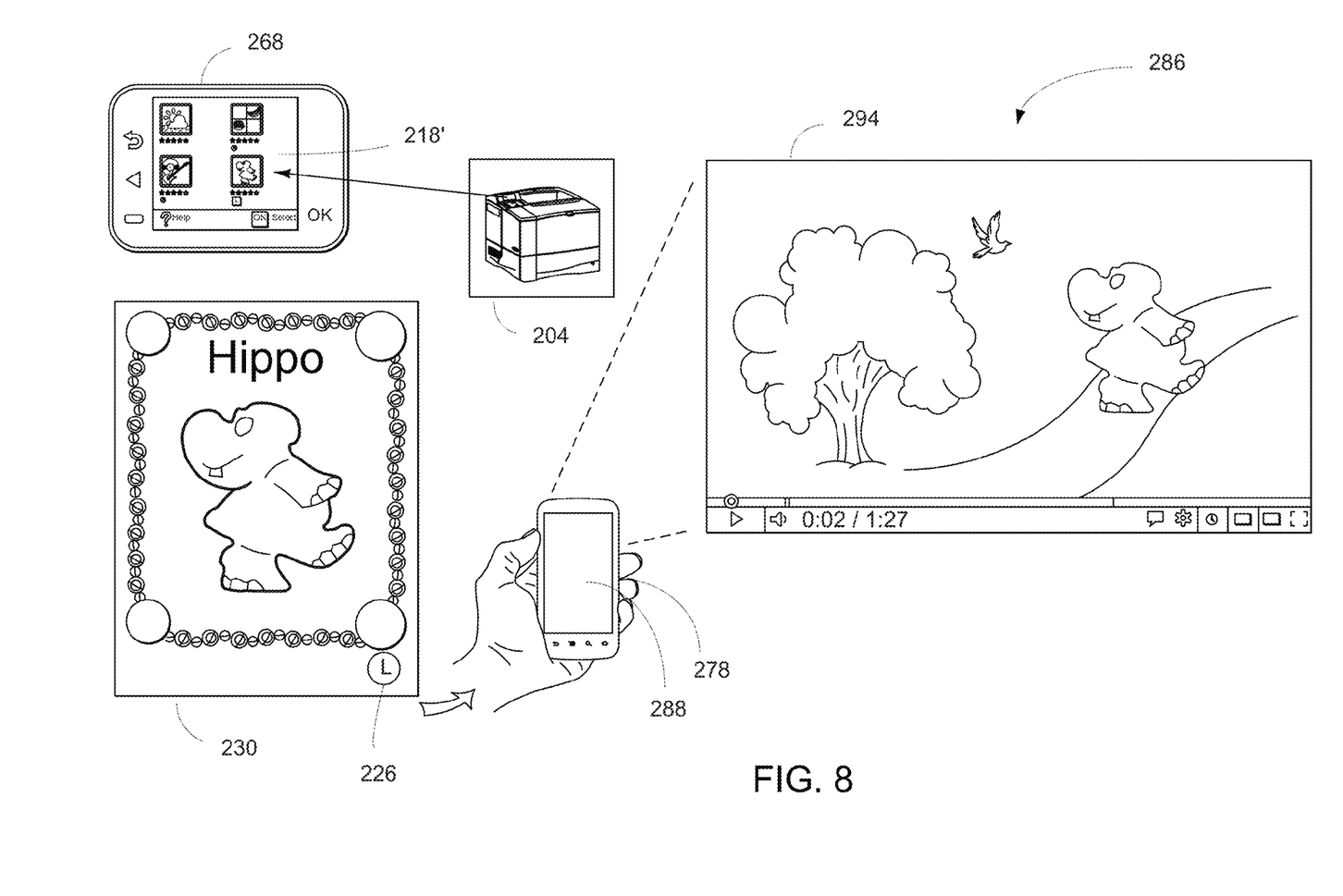
FIG. 8 illustrates recovery of data from a document generated via a live print printer application to cause a video display, according to various examples.

FIG. 8, in view of FIGS. 2 and 7, illustrates an example of the URL recovery and live content generation process. In the example of FIG. 8, a user, utilizing a user interface 268 (FIG. 2) at internet-connected printer 204, sends a print directive 222 (FIG. 2) via a children's coloring pages printer application 218' that has been installed at an internet connected printer 204. The print directive 222 is an instruction for the printer application 218 to facilitate the printing of a "Hippo" coloring page 230. The "Hippo" coloring page 230 is printed with a carrier image 226 that is a corporate logo. In this example, the carrier image 226 is a data-bearing halftone image in the form of an "L" corporate logo 702 (FIG. 7).

At some point after the printing of the merged first content at printer 204, a user utilizes a smartphone 278 that has an inboard camera to create a digital representation of the "Hippo" coloring page 230, or at least the portion of the page that includes the carrier image 226. The user utilizes the smartphone 278 to send the scanned carrier image 282 (FIG. 2) to the server system 202 (FIG. 2) via the internet.

The LPPAS 210 (FIG. 2) executing at server system 202 receives the scanned carrier image 282, and recovers the URL 220 (FIG. 2) from the carrier image 226. The LPPAS 210 then sends the URL 220 to the smartphone 278 for the smartphone to utilize to access video display content 294 for display at the smartphone. In the example of FIG. 8, the video content 294 includes a video that is associated with the "Hippo" coloring page 230 that was printed at printer 204. The smartphone 278 displays 286 the video content 294 via the smartphone's touchscreen display apparatus 288.

The functions and operations described with respect to the LPPAS 210 and the server system 202 may be implemented as a non-transitory computer-readable storage medium containing instructions executed by a processor (e.g., processor 212) and stored in a memory (e.g., memory 214). In a given implementation, processor 212 may represent multiple processors, and memory 214 may represent multiple memories. Processor 212 represents generally any instruction execution system, such as a computer/processor based system or an ASIC (Application Specific Integrated Circuit), a computer, or other system that can fetch or obtain instructions or logic stored in memory 214 and execute the instructions or logic contained therein. Memory 214 represents generally any memory configured to store program instructions and other data.

Figure 9:
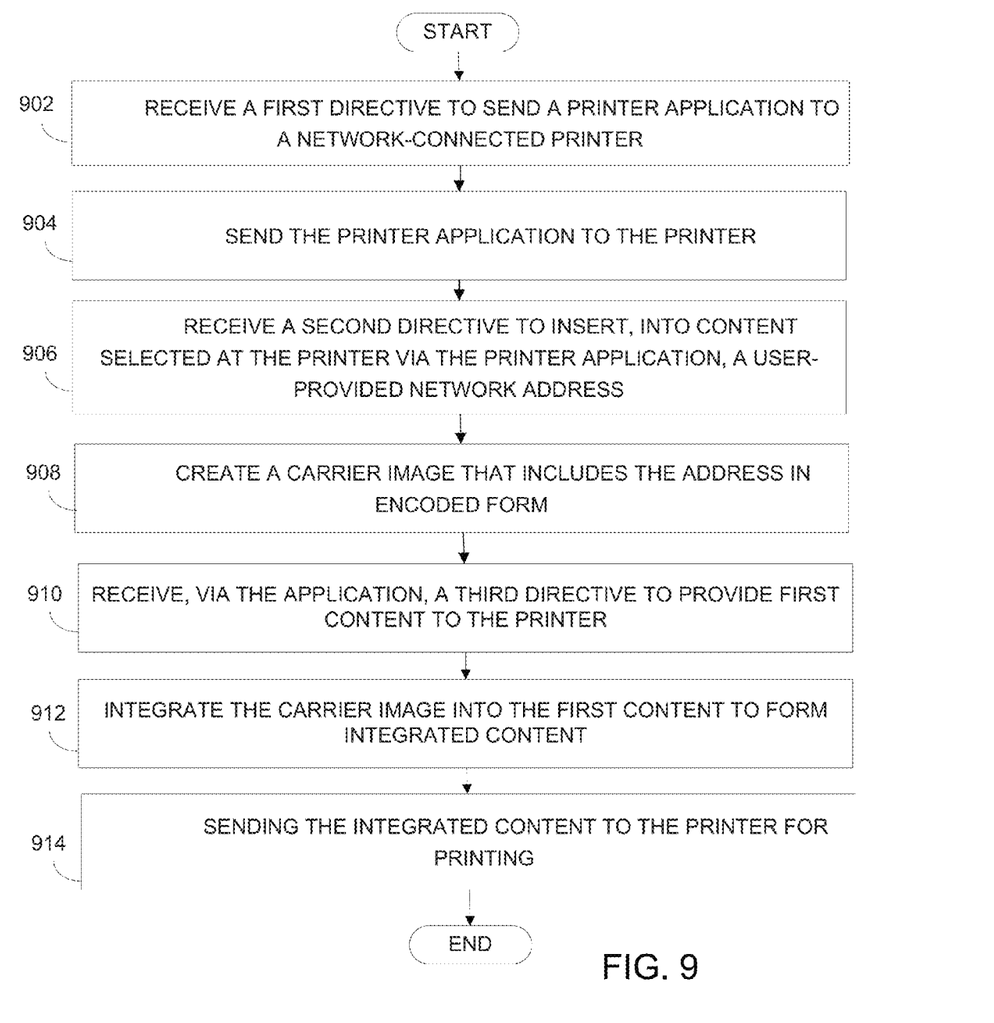
FIG. 9 is a flow diagram depicting steps taken to implement various examples.

FIG. 9 is a flow diagram of operation in a system according to various examples. In discussing FIG. 9, reference may be made to the diagrams of FIG. 2 to provide contextual examples. Implementation, however, is not limited to those examples. Starting with FIG. 9, a first directive is received. The directive is to send a printer application to a network-connected printer (block 902). Referring back to FIG. 2, printer application delivery module 238 may be responsible for implementing block 902.

Continuing with FIG. 9, the application is sent to the printer (block 904). Referring back to FIG. 2, printer application delivery module 238 may be responsible for implementing block 904.

Continuing with FIG. 9, a second directive is received. The second directive is to insert, into content selected via a printer application accessed at a network-connected printer, a user-provided network address (block 906). Referring back to FIG. 2, embedding directive module 240 may be responsible for implementing block 906.

Continuing with FIG. 9, a carrier image is created. The carrier image includes the address in encoded form (block 908), Referring back to FIG. 2, carrier images module 242 may be responsible for implementing block 908.

Continuing with FIG. 9, a third directive is received via the printer application. The third directive is to provide the first content to the printer (block 910). Referring back to FIG. 2, print directive module 244 may be responsible for implementing block 910.

Continuing with FIG. 9, the carrier image is integrated into the first content to Form integrated content (block 912). Referring back to FIG. 2, merger module 246 may be responsible for implementing block 912.

Continuing with FIG. 9, after the integrating, the integrated content is sent to the printer for printing (block 914). Referring back to FIG. 2, job-sending module 248 may be responsible for implementing block 914.

Figure 10:
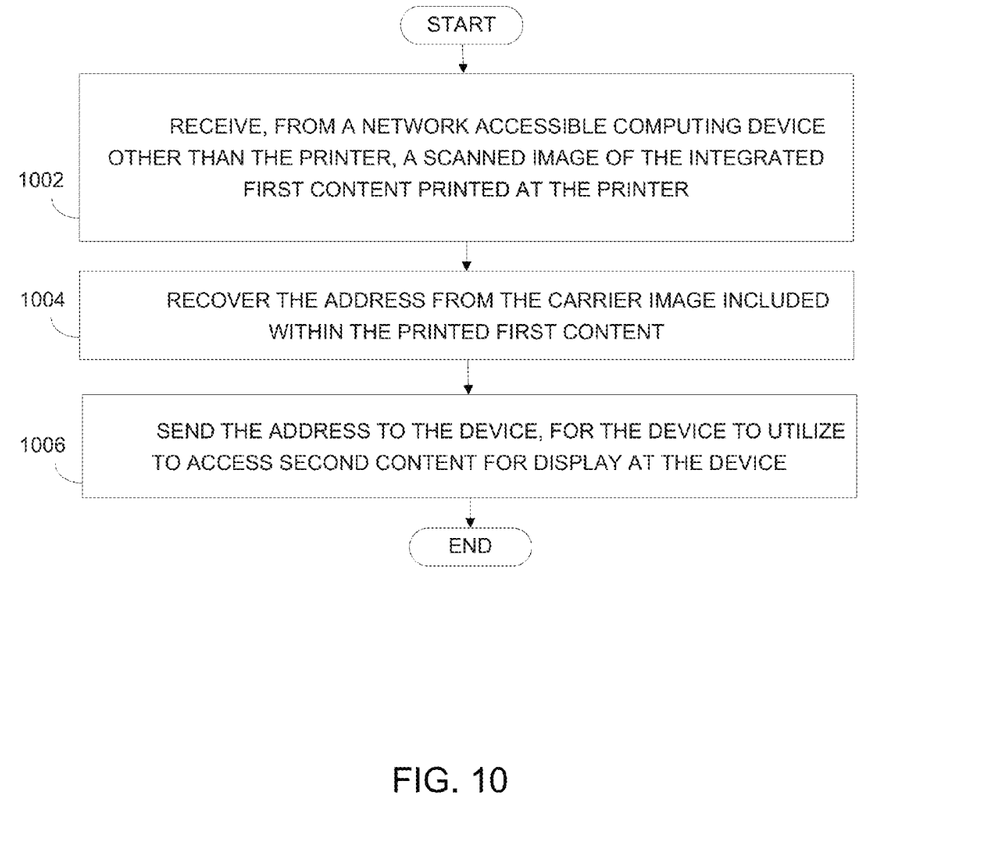
FIG. 10 is a flow diagram depicting steps taken to implement various examples.

FIG. 10 is a flow diagram of operation in a system according to various examples. In discussing FIG. 10, reference may be made to the diagrams of FIG. 2 to provide contextual examples. Implementation, however, is not limited to those examples. Starting with FIG. 10, a scanned image of the integrated first content, as printed at the printer, is received. The scanned image is received from a network accessible computing device other than the printer (block 1002). Referring back to FIG. 2, address recovery module 250 may be responsible for implementing block 1002.

Continuing with FIG. 10, the address is recovered from the carrier image included within the integrated first content (block 1004). Referring back to FIG. 2, address recovery module 250 may be responsible for implementing block 1004.

Continuing with FIG. 10, the address is sent to the device to be utilized to access second content for display at the device (block 1006). Referring back to FIG. 2, address recovery module 250 may be responsible for implementing block 1006.

Various modifications may be made to the disclosed examples and implementations without departing from their scope. Therefore, the illustrations and examples herein should be construed in an illustrative, and not a restrictive, sense.

What is claimed is:

1. A non-transitory computer-readable storage medium comprising instructions that, when executed, cause a cloud printing server hosted on a first server to:
- receive, at the cloud printing server, a first directive from a printer to embed a network address into first content to be printed at the printer;
- generate a carrier image that includes the network address in encoded form;
- after receiving the first directive, receive, at the cloud printing server, a second directive from the printer to provide the first content to the printer;
- obtain the first content from a content repository hosted on a second server in response to the second directive;
- merge the carrier image into the obtained first content;
- after the merging, send the merged first content to the printer for printing;
- receive, from a network accessible computing device other than the printer, a scanned image of the merged first content;
- recover the network address from the carrier image; and
- send the network address to the network accessible computing device, wherein the network accessible computing device utilizes the network address to access second content for display at the network accessible computing device.

2. The medium of claim 1, wherein the second directive is initiated via a user interface at the printer.

3. The medium of claim 1, wherein the instructions cause the cloud printing server to receive a third directive to send a printer application to the printer, and to send the printer application to the printer.

4. The medium of claim 3, wherein the third directive is received from the printer.

5. The medium of claim 1, wherein the network address is a user-provided address.

6. The medium of claim 1, wherein the carrier image is a data-bearing halftone image.

7. The medium of claim 1, wherein the instructions cause the cloud printing server to receive a grayscale image of a graphic, and
- wherein the carrier image includes a bi-tonal clustered-dot halftone of the graphic having selected clusters shifted to carry varying numbers of bits representative of the address.

8. The medium of claim 1, wherein the carrier image includes a logo.

9. The medium of claim 1, wherein the instructions cause the cloud printing server to rasterize the first content.

10. The medium of claim 1, wherein the instructions cause the cloud printing server to rasterize the first content without rasterizing the carrier image.

11. The medium of claim 1, wherein the second content includes video content.

12. The medium of claim 1, wherein the second content includes audio content.

13. A system comprising:
- at least one processor; and
- a memory storing instructions that, when executed by the at least one processor, cause the at least one processor to:
- receive, from a printer, a first directive to embed a network address into first content to be printed by the printer;
- generate a carrier image that includes the network address in encoded form;
- after receiving the first directive, receive a second directive from the printer to provide the first content to the printer;
- send a network request to a server hosting a content repository to obtain the first content from the content repository;
- merge the carrier image into the obtained first content;
- send the merged first content to the printer for printing;
- receive, from a network accessible computing device other than the printer, a scanned image of the merged first content as printed at the printer;
- recover the network address from the received scanned image of the printed merged first content; and
- send the network address to the network accessible computing device, wherein the network accessible computing device utilizes the network address to access second content for display at the network accessible computing device.

14. The system of claim 13, wherein the at least one processor is to:
- send a printer application to the printer.

15. The system of claim 13, wherein the at least one processor is to rasterize the first content.

16. A computer-implemented method, comprising:
- receiving, at a cloud printing server, a first directive from a printer to embed a network address into first content to be printed at the printer;
- creating a carrier image that includes the network address in encoded form;
- receiving, at the cloud printing server, a second directive from the printer to provide the first content to the printer;
- sending, by the cloud printing server, a network request to a server hosting a content repository to obtain the first content from the content repository;
- merging, by the cloud printing server, the carrier image into the obtained first content to form merged first content;
- sending the merged first content to the printer for printing;
- receiving, from a network accessible computing device other than the printer, a scanned image of the merged first content printed at the printer;
- recovering the network address from the scanned image; and
- sending the network address to the network accessible computing device, wherein the network accessible computing device utilizes the network address to access second content for display at the network accessible computing device.

* * * * *